United States Patent
Nakagawa (10) Patent No.: US 10,554,941 B2
(45) Date of Patent: Feb. 4, 2020

(54) PROJECTOR DEVICE AND METHOD FOR CORRECTING COLOR IN PROJECTOR DEVICE

(71) Applicant: NEC Display Solutions, Ltd., Tokyo (JP)

(72) Inventor: Tomohiro Nakagawa, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 87 days.

(21) Appl. No.: 15/744,444

(22) PCT Filed: Jul. 27, 2015

(86) PCT No.: PCT/JP2015/071227
§ 371 (c)(1),
(2) Date: Jan. 12, 2018

(87) PCT Pub. No.: WO2017/017758
PCT Pub. Date: Feb. 2, 2017

(65) Prior Publication Data
US 2018/0205919 A1   Jul. 19, 2018

(51) Int. Cl.
*H04N 9/31* (2006.01)
*G03B 21/00* (2006.01)
(Continued)

(52) U.S. Cl.
CPC ......... *H04N 9/3194* (2013.01); *H04N 9/3164* (2013.01); *H04N 9/3182* (2013.01);
(Continued)

(58) Field of Classification Search
CPC .. H04N 9/3194; H04N 9/3164; H04N 9/3182; G03B 21/008; G03B 21/2013; G03B 21/204; G03B 33/12
See application file for complete search history.

(56) References Cited

U.S. PATENT DOCUMENTS 6,388,648 B1 * 5/2002 Clifton ............... H04N 9/3147
                                                        345/4
2013/0314629 A1 * 11/2013 Yasui ............... G02B 27/2264
                                                        349/15
(Continued)

FOREIGN PATENT DOCUMENTS

JP    2007-065012 A    3/2007
JP    2007-065574 A    3/2007
(Continued)

OTHER PUBLICATIONS

International Search Report (ISR) (PCT Form PCT/ISA/210), in PCT/JP2015/071227, dated Oct. 6, 2015.

*Primary Examiner* — Michael E Teitelbaum
(74) *Attorney, Agent, or Firm* — McGinn I.P. Law Group, PLLC (57) ABSTRACT

A white balance is adjusted with high precision, irrespective of the contents of an image formed by an image forming element. A projector device includes: a plurality of light sources each of which emits a different type of color light; a plurality of image forming elements each of which, upon irradiation with the different type of color light, forms a respective image corresponding to the different type of color; a plurality of sensors (101R, 101G, 101B) each of which detects a respective luminance of the different type of color light with which one corresponding image forming element, from among a plurality of image forming elements, is irradiated; and a controller (controller 302) that adjusts a white balance by correcting respective detection values detected by the plurality of sensors in accordance with the luminances of the images formed by the image forming elements corresponding to the colors of light detected by the sensors, and by controlling outputs from the plurality of light sources in accordance with the corrected values.

20 Claims, 4 Drawing Sheets

(51) Int. Cl.
*G03B 21/20* (2006.01)
*G03B 33/12* (2006.01)

(52) U.S. Cl.
CPC .......... *G03B 21/008* (2013.01); *G03B 21/204* (2013.01); *G03B 21/2013* (2013.01); *G03B 33/12* (2013.01)

(56) References Cited

U.S. PATENT DOCUMENTS

2014/0092001 A1* 4/2014 Kikkawa .............. G09G 3/3406
  345/102
2016/0255313 A1* 9/2016 Samejima .......... G03B 21/2033
  353/85

FOREIGN PATENT DOCUMENTS

| JP | 2007-189359 A | 7/2007 |
| JP | 2007-208399 A | 8/2007 |
| JP | 2007-300187 A | 11/2007 |
| JP | 2014-071204 A | 4/2014 |
| JP | 2015-018051 A | 1/2015 |
| JP | 2015-057671 A | 3/2015 |
| JP | 2015-099768 A | 5/2015 |

* cited by examiner

| CLASS | CORRECTION COEFFICIENT |
|---|---|
| 0 | r0' |
| 1 | r1' |
| 2 | r2' |
| Ave1 | r3' |
| Ave2 | r4' |
| Ave3 | r5' |
| Ave4 | r6' |

| APL RL | CORRECTION COEFFICIENT |
|---|---|
| L0＜RL≦L1 | RL0' |
| L1＜RL≦L2 | RL1' |
| L2＜RL≦L3 | RL2' |
| L3＜RL≦L4 | RL3' |
| L4＜RL≦L5 | RL4' |
| . | . |
| . | . |

PROJECTOR DEVICE AND METHOD FOR CORRECTING COLOR IN PROJECTOR DEVICE

TECHNICAL FIELD

The present invention relates to a projector device and a method for correcting colors in the projector device.

BACKGROUND ART

Patent document 1 discloses a white balance adjustment method for a projector device using a plurality of laser light sources that emit different types of color laser light and using a plurality of image forming elements that form images corresponding to the respective colors of the laser light, the method involving disposing respective color sensors for detecting light quantities in the light paths of the laser light sources, and controlling outputs from the laser light sources according to values detected by the sensors. Such white balance adjustment is performed in order to adjust the light quantities having changed due to aged deterioration of the laser light sources or in order to maintain the white balance at a time of a laser output change for light control.

The respective color sensors disposed in the light paths of the laser light sources are provided on the rear surface of a reflection mirror for bending the light paths of the laser light. The reflection mirror reflects most of the indent light, but a part of the incident light passes through the reflection mirror. Since the ratio of the passing light to the incident light is fixed, the light quantities of laser light are detected through sensing of the passing light.

CITATION LIST

Patent Literature

Patent Document 1: JP2007-065574A

SUMMARY OF INVENTION

Technical Problem

In sensing performed by a color sensor, a value acquired by the color sensor may be influenced by the contents of an image formed by an image forming element.

In a case where an image is formed with use of a DMD (a digital micromirror device) having provided therein multiple mirrors corresponding to pixels, if a color sensor is disposed near the DMD, a reflection mirror may be irradiated with reflection light from the DMD, depending on the inclinations of the mirrors included in the DMD at which the mirrors are ON or OFF. In addition, light leakage from an optical component other than the reflection mirror may have an effect.

Also in a case where an image forming element other than a DMD, such as an LCD (liquid crystal display) panel is used, the aforementioned effect of the reflection of light caused by the image forming element according to a formed image, may be exerted. Also in an LCD panel, the condition of reflection light varies depending on the contents of a formed image.

Accordingly, a data value acquired by a color sensor when a formed image is all white and a data value when a formed image has another pattern, for example, may be different from each other.

In order to obtain a desired white color, illuminances was acquired by color sensors and white balance adjustment was performed. However, values acquired by color sensors vary depending on a formed image. Accordingly, the problem of obtaining precise white balance adjustment has arisen.

The present invention realizes a projector device capable of adjusting a white balance with high precision, irrespective of the contents of an image formed by an image forming element, and also realizes a method for correcting colors in the projector device.

Solution to Problem

A projector device according to the present invention includes:

a plurality of light sources each of which emits a different type of color light;

a plurality of image forming elements each of which, upon irradiation with the different type of color light, forms a respective image corresponding to the different type of color;

a plurality of sensors each of which detects a respective luminance of the different type of color light with which one corresponding image forming element, from among a plurality of image forming elements, is irradiated; and a controller that adjusts white balance by correcting respective detection values detected by the plurality of sensors in accordance with the luminances of the images formed by the image forming elements corresponding to the respective colors of light detected by the sensors, and by controlling outputs from the plurality of light sources in accordance with the corrected values.

A color correcting method according to the present invention is to be performed by a projector device including a plurality of light sources each of which emits a different type of color light and a plurality of image forming elements each of which, upon irradiation with the different type of color light, forms a respective image corresponding to the different type of color, the method comprising:

causing the plurality of sensors to detect respective luminances of the different type of color light with which one corresponding image forming element, from among a plurality of image forming elements, is irradiated; and adjusting white balance by causing a controller to correct respective detection values detected by the plurality of sensors in accordance with luminances of the images formed by the image forming elements corresponding to the respective colors of the light detected by the sensors, and to control outputs from the plurality of light sources in accordance with the corrected values.

Advantage Effects of Invention

According to the preset invention, a white balance is adjusted with high precision, irrespective of the contents of an image formed by an image forming element.

DESCRIPTION OF EMBODIMENTS

Next, exemplary embodiments of the present invention are described with reference to the drawings.

First Exemplary Embodiment

Figure 1:
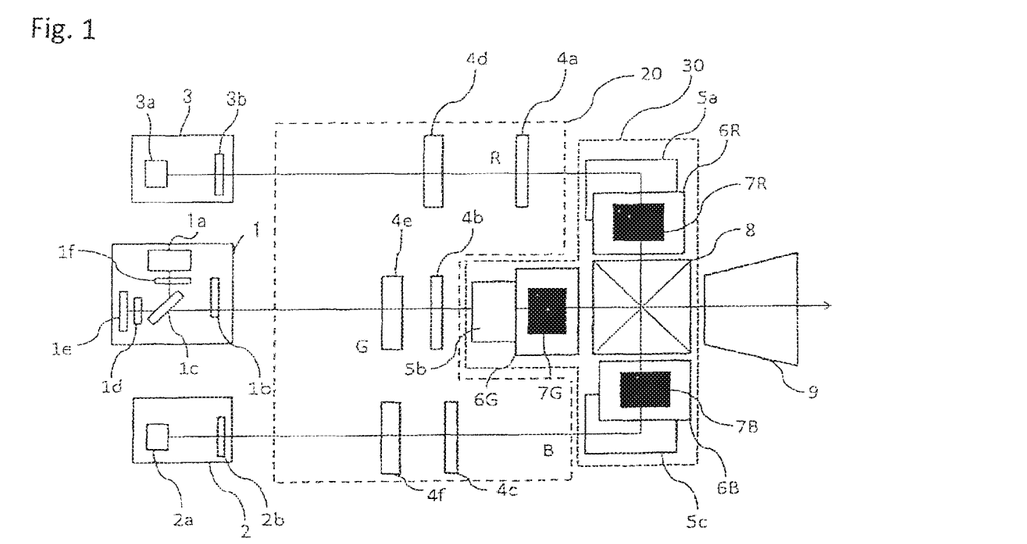
FIG. 1 is a schematic diagram illustrating a configuration of an optical system in a first exemplary embodiment of a projector according to the present invention.

FIG. 1 is a schematic diagram illustrating a configuration of an optical system in a first exemplary embodiment of a projector according to the present invention.

As illustrated in FIG. 1, the projector in the present exemplary embodiment includes light sources 1 to 3, illuminator 20, photosynthesizer 30, and lens 9.

Light source 1 includes blue laser element 1a, lenses 1b, 1f, 1d, dichroic mirror 1c, and fluorescent substance wheel 1e. Light source 2 includes blue laser element 2a and lens 2b. Light source 3 includes red laser element 3a and lens 3b.

Illuminator 20 includes lenses 4a to 4c and integrators 4d to 4f.

Photosynthesizer 30 includes mirrors 5a to 5c, TIR prisms 6R, 6G, 6B, DMDs 7R, 7G, 7B, cross dichroic prism 8, and lens 9.

In light source 1, blue laser excitation light generated at blue laser element 1a and emitted through lens 1f is incident on dichroic mirror 1c. Dichroic mirror 1c reflects light of the blue wavelength band and allows light of a longer wavelength band relative to the blue wavelength band to be transmitted therethrough. Accordingly, the laser excitation light is reflected by dichroic mirror 1c, and is condensed onto fluorescent substance wheel 1e by lens 1d.

Fluorescent substance wheel 1e is provided with a fluorescent body (not illustrated) that emits green fluorescence by being excited by the laser excitation light.

The green fluorescence emitted from the fluorescent body enters dichroic mirror 1c through lens 1d, is transmitted through dichroic mirror 1c, and is supplied to illuminator 20 through lens 1b.

In light source 2, blue excitation light generated by blue laser element 2a is supplied to illuminator 20 through lens 2b.

In light source 3, red excitation light generated by red laser element 3a is supplied to illuminator 20 through lens 3b.

In illuminator 20, the red light (hereinafter, R light) supplied from light source 3 is used as light of an R light path in which R light travels through lens 4a and optical element integrator 4d configured to uniformize light.

The green fluorescence (hereinafter, G light) supplied from light source 1 is used as light of a G light path in which G light travels through integrator 4e and lens 4b. The blue light (hereinafter, B light) supplied from light source 2 is used as light of a B light path in which blue color travels through integrator 4f and lens 4c.

Photosynthesizer 30 is described with reference to FIG. 2 which is a schematic diagram of a G light path.

Figure 2:
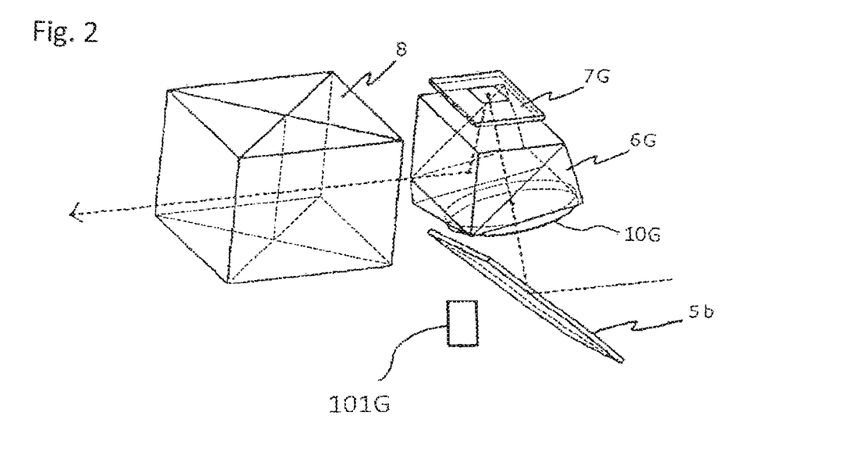
FIG. 2 is a diagram illustrating a configuration of a B light path.

A description of the configuration of the B light path given with reference to FIG. 2 also applies to the R light path and the B light path.

In FIG. 2, broken lines represent rays of light. The G light supplied from illuminator 20 is reflected toward TIR prism 6G by reflection mirror 5b, and is supplied to TIR prism 6G through field lens 10G.

The G light having entered TIR prism 6G passes through TIR prism 6G and reaches DMD 7G. The G light having been reflected by DMD 7G enters TIR prism 6G again. The G light is reflected by all the reflection surfaces inside TIR prism 6G, and enters cross dichroic prism 8.

Color sensor 101G that selectively receives green light is disposed on a surface, of reflection mirror 5B, opposite to TIR prism 6G. Reflection mirror 5B is disposed such that a loss caused by reflection is minimum. Color sensor 101G detects light having entered and having been transmitted through reflection mirror 5B. The quantity of the transmitted light is approximately 1 to 2% of light that entered reflection mirror 5B.

Also in the R light path, R light that entered TIR prism 6R is reflected by DMD 7R, and enters TIR prism 6R again. The R light is reflected by all the reflection surfaces of TIR prism 6R, and enters cross dichroic prism 8. Color sensor 101R (not illustrated) that selectively receives red light is provided at the same position in the R light path, as that in the G light path.

Also in the B light path, B light that entered TIR prism 6B is reflected by DMD 7B, and enters TIR prism 6B again. The B light is reflected by all the reflection surfaces of TIR prism 6B, and enters cross dichroic prism 8. Color sensor 101B (not illustrated) that selectively receives blue light is provided at the same position in the B light path, as those in the G light path and the R light path.

In cross dichroic prism 8, the incident R light from TIR prism 6R is reflected toward lens 9 by reflection surfaces formed inside cross dichroic prism 8. Cross dichroic prism 8 allows the incident G light from TIR prism 6G to be transmitted through cross dichroic prism 8 toward lens 9. The incident B light from TIR prism 6B is reflected toward lens 9 by the reflection surfaces formed inside cross dichroic prism 8. In this way, cross dichroic prism 8 has a role to synthesize R light, G light, and B light and supplies the synthesized light to lens 9.

Figure 3:
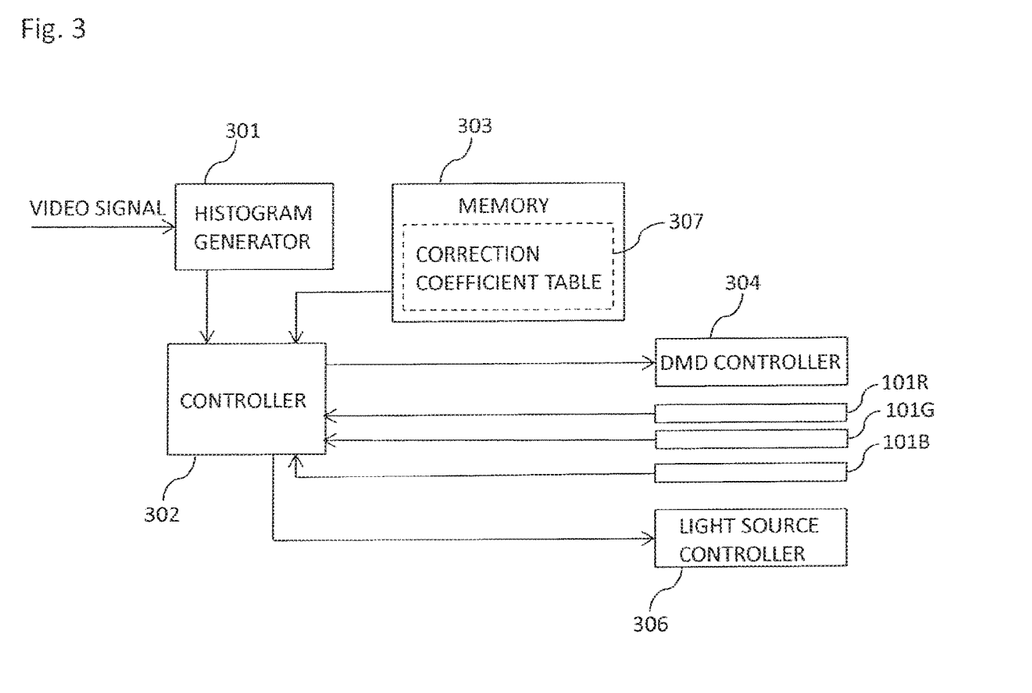
FIG. 3 is a block diagram illustrating a configuration of the main components of an electric system in the first exemplary embodiment of the projector according to the present invention.

FIG. 3 is a block diagram illustrating a configuration of the main components of an electric system in the present exemplary embodiment. Hereinafter, processes executed in the electric system of the present exemplary embodiment are described with reference to FIG. 3.

The electric system of the present exemplary embodiment is formed of histogram generator 301, controller 302 that executes a calculation process, memory 303, DMD controller 304, color sensors 101R, 101G, 101B, and light source controller 306. Memory 303 includes correction coefficient table 307.

As color sensors 101R, 101G, 101B, any sensors capable of acquiring the brightness of light paths can be used. In the present exemplary embodiment, color sensors that selectively receive specific color light are used in order to prevent incidence of stray light as much as possible. Alternatively, illuminance sensors may be used because control is performed while the luminances of the light paths are detected.

Each of color sensors 101R, 101G, 101B used in the present exemplary embodiment is provided with an analog-digital converter therein, such that digital data is transmitted to controller 302. Alternatively, an analog-digital converter may be disposed outside each of color sensors 101R, 101G, 101B such that analog data is outputted.

Histogram generator 301 inputs a video signal, generates histograms of R, G, and B images indicated by the video signal, and outputs, to controller 302, a signal indicating the result of the histograms as well as the video signal.

Memory 303 stores therein a program for operating controller 302. Correction coefficient table 307 included in memory 303 stores therein correction coefficients to be used when controller 302 controls light sources 1a, 2a, 3a through light source controller 306.

Controller 302 is formed of a CPU (a central processing unit). It can be said that controller 302 and memory 303 form a computer and the computer is incorporated in the projector of the present exemplary embodiment.

According to the video signal transmitted from histogram generator 301, controller 302 controls DMDs 7R, 7G, 7B via DMD controller 304 so as to cause DMDs 7R, 7G, 7B to form R, G, B images, respectively. Here, the light quantities of blue laser elements 1a, 2a and red laser element 3a are controlled according to histogram data which is transmitted from histogram generator 301 and which indicates the result of histograms of the images, the color sensor values acquired from color sensors 101R, 101G, 101B, and the correction coefficients stored in correction coefficient table 307. Control of the light quantities of the laser elements is performed via light source controller 306 that controls current to be supplied to the laser elements.

As an example of control of the light quantity of a laser element to be performed in the present exemplary embodiment, control of the light quantity of red laser element 3a is described below.

Figure 4:
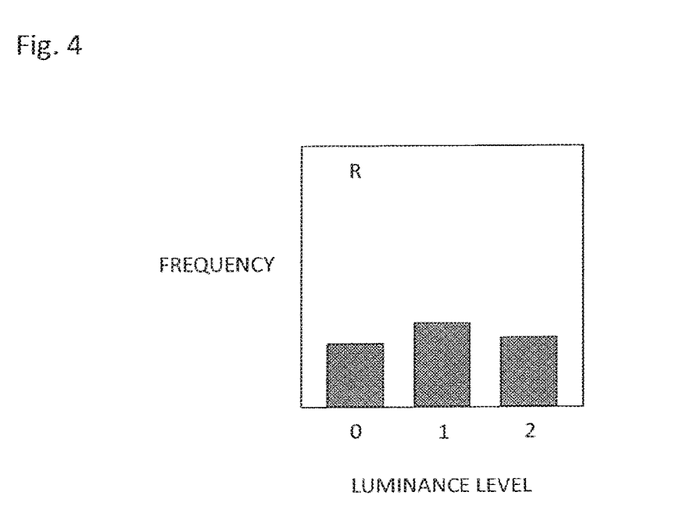
FIG. 4 shows a result of analysis performed by controller 302 in FIG. 3 on histogram data about an R image transmitted from histogram generator 301.

FIG. 4 shows a result of analysis performed by controller 302 on histogram data about an R image transmitted from histogram generator 301. As shown in FIG. 4, the analysis result is expressed by a luminance level (a luminance value) and a frequency (the number of pixels). The luminance value takes values of 0 to 256. The luminance values are divided into three levels such that the luminance 0 to 85 is defined as a luminance level 0, the luminance 86 to 171 is defined as a luminance level 1, and the luminance 172 to 256 is defined as a luminance level 2.

Next, the differences between the frequencies of the luminance levels are obtained. The class is determined according to the difference between the class having the largest frequency and the frequencies of the other classes and according to a predetermined threshold.

Figure 5:
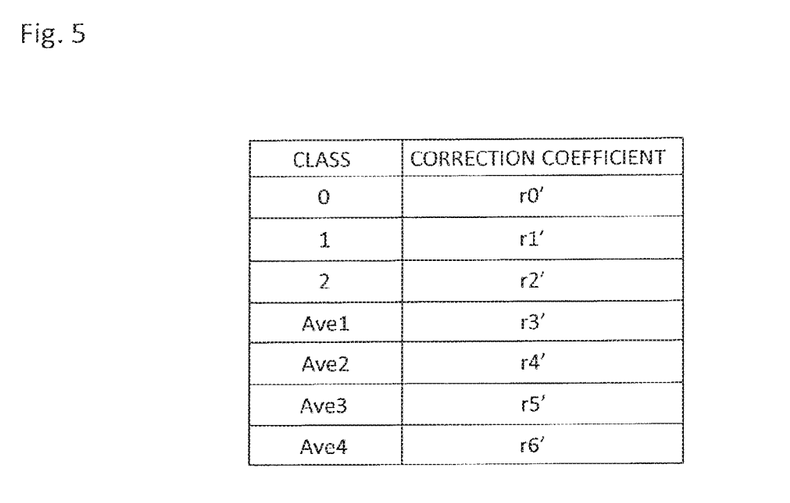
FIG. 5 shows the details of R-image correction coefficients stored in correction coefficient table 307 in FIG. 3.

Correction coefficient table 307 stores correction coefficients corresponding to the determined classes. FIG. 5 shows the details of R-image correction coefficients stored in correction coefficient table 307. Seven classes including 0 to 2 and Ave1 to Ave4 are set as the classes, and correction coefficients r0' to r6' corresponding to the respective classes are stored, as shown in FIG. 5.

The class is determined on the basis of a luminance level and a threshold as follows.

(1) The class 0 is selected when the frequency of the luminance level 0 is greater than that of luminance level 1 and that of luminance level 2 with the frequency difference therebetween equal to or larger than the threshold.

(2) The class 1 is selected when the frequency of luminance level 1 is greater than that of luminance level 2 and that of luminance level 3 with the frequency difference therebetween equal to or larger than the threshold.

(3) The class 3 is selected when the frequency of luminance level 3 is greater than that of luminance level 0 and that of luminance level 1 with the frequency difference therebetween equal to or larger than the threshold.

(4) The class AVE1 is selected when the frequency difference between luminance level 1 and luminance level 2 is equal to or smaller than the threshold and when the frequency of luminance level 0 is lower than those of luminance levels 1, 2 with the frequency difference therebetween equal to or larger than the threshold.

(5) The class AVE2 is selected when the frequency difference between luminance level 0 and luminance level 2 is equal to or smaller than the threshold and when the frequency of luminance level 1 is lower than those of the luminance levels 0, 2 with the frequency difference equal to or larger than the threshold.

(6) The class AVE3 is selected when the frequency difference between luminance level 0 and luminance level 1 is equal to or smaller than the threshold and when the frequency of the luminance level 2 is lower than those of the luminance levels 0, 1 with the frequency difference therebetween equal to or larger than the threshold.

(7) The class AVE4 is selected when the difference among luminance level 0, luminance level 1, and luminance level 2 is equal to or smaller than the threshold.

A selection method by which the class is selected as described above, is described.

When a bright part of a formed image is large, an acquired color sensor value is likely to be high, and when a dark part is large, an acquired color sensor value is likely to be low. This is caused by the influence of ON light from the DMD. In order to cancel the influence, a correction amount to be obtained by the correction coefficient r2' corresponding to the class 2, for example, which is a class indicative of an image having a large bright part is set to be larger than a correction amount to be obtained by the correction coefficient r0' corresponding to the class 0, for example, which is a class indicative of an image having a large dark part.

For the G image and the B image, the same manner is used to obtain the respective correction coefficients. Values acquired from the color sensors 101R, 101G, 101B are corrected by use of the obtained correction coefficients, and outputs from the laser sources 1a, 2a, 3a illustrated in FIG. 1 are made variable, via light source controller 306, in accordance with the corrected color sensor values, whereby white balance control is performed.

Figure 6:
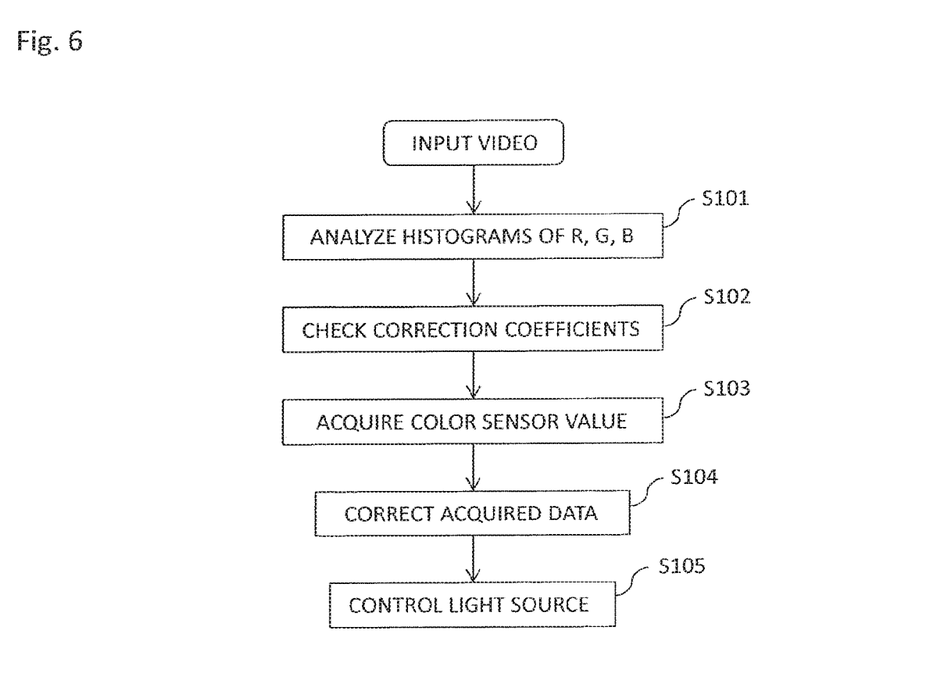
FIG. 6 is a flowchart showing a light source control operation performed in the first exemplary embodiment of the projector according to the present invention.

FIG. 6 is a flowchart showing a light source control operation performed in the present exemplary embodiment.

When a video signal is inputted to the projector, histogram analysis of R, G, B images indicated by the video signal is executed (step S101). The histogram analysis is executed as described above, and accordingly, correction coefficients to be used for the colors of R, G, and B are determined by checking correction coefficient table 307 (step S102).

Next, respective color sensor values are acquired from color sensors 101R, 101G, 101B (step S103), and the color sensor values are corrected by use of the correction coefficients which have been determined at step S102 so as to be used for R, G, B colors, respectively (step S104). On the basis of the corrected color sensor values, light source control is performed such that the chromaticity of a desired white color is obtained (step S105).

Second Exemplary Embodiment

In the above first exemplary embodiment, histogram analysis is performed on R, G, B images indicated by a video signal so that respective correction coefficients to be used for the images are determined. In the second exemplary embodiment of the present invention, correction coefficients are determined by use of respective APLs (average luminance levels) of images.

Figure 7:
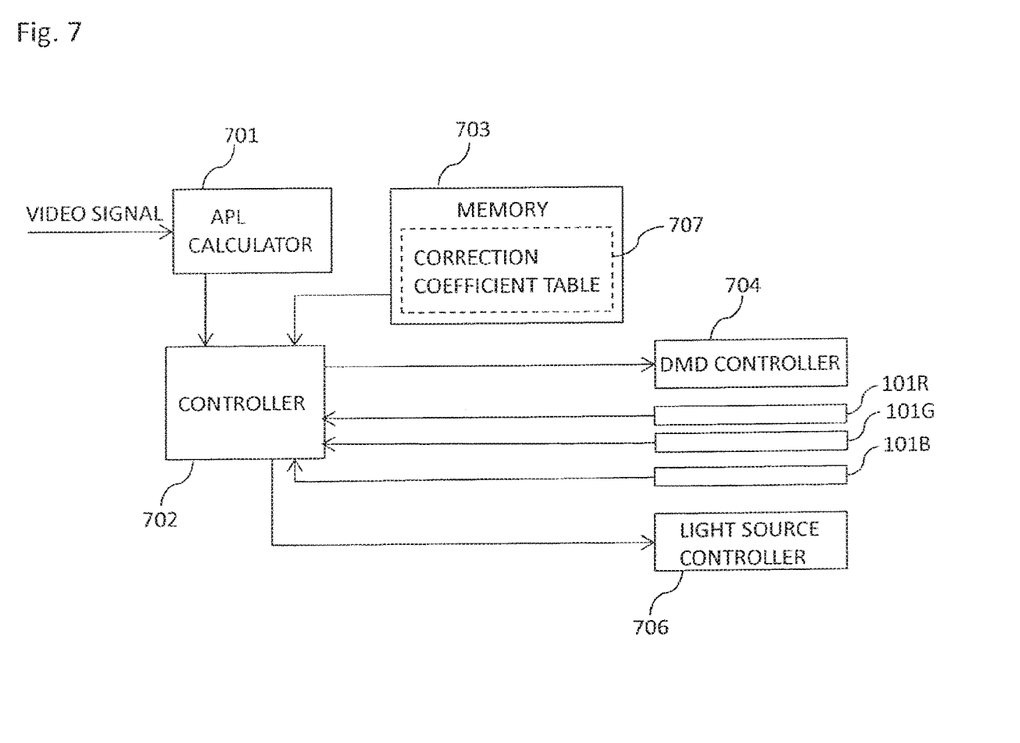
FIG. 7 is a block diagram illustrating a configuration of the main components of an electric system in a second exemplary embodiment of the projector according to the present invention.

The configuration of an optical system of the present exemplary embodiment is identical to that of the first exemplary embodiment illustrated in FIG. 1. FIG. 7 is a block diagram illustrating a configuration of an electric system of the present exemplary embodiment.

The configurations and operations of controller 702, memory 703, DMD controller 704, and light source controller 706 are identical to those of controller 102, memory 103, DMD controller 104, and light source controller 106 illustrated in FIG. 1, respectively.

Instead of histogram generator 301 provided in the first exemplary embodiment, APL calculator 701 is provided in the present exemplary embodiment. When a video signal is inputted to the projector, APL calculator 701 obtains respective APLs of R, G, B images indicated by the video signal, and outputs, to controller 702, a signal indicative of the obtained APLs as well as the video signal.

Figure 8:
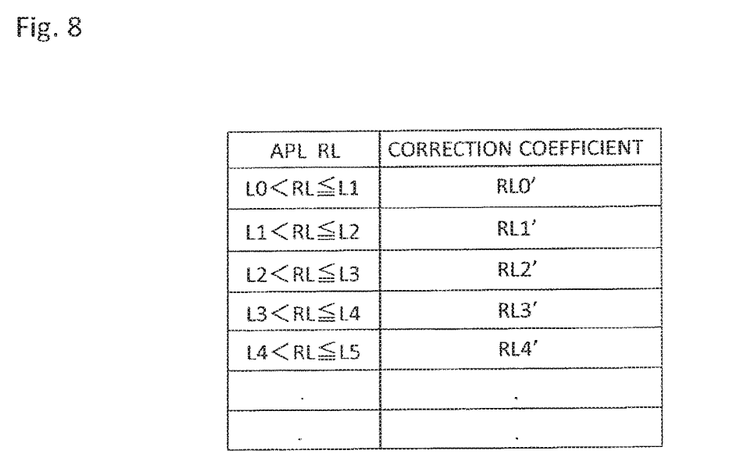
FIG. 8 shows the details of R-image correction coefficients stored in correction coefficient table 707 in FIG. 7.

As shown in FIG. 8, correction coefficient table 707 incorporated in memory 703 of the present exemplary embodiment stores correction coefficients corresponding to APL ranges.

Here, a description of an R image is given.

The average luminance level of an obtained R image is defined as RL. As shown in FIG. 8, the correction coefficient corresponding to respective average luminance levels are different. For example, RL0' is stored in correction coefficient table 707 as the correction coefficient corresponding to the average luminance level RL satisfying RL0<RL≤RL1. RL1' is stored in correction coefficient table 707 as the correction coefficient corresponding to the average luminance level RL satisfying RL1<RL≤RL2.

In this way, the correction coefficients corresponding to the average luminance levels RL are determined. By use of the correction coefficients, the sensor value acquired from color sensor 101R is corrected.

Correction coefficient table 707 also stores correction coefficients for average luminance levels GL of the G image and correction coefficients for average luminance levels BL of the B image. The correction coefficients for the average luminance level GL of the G image and the average luminance level BL of the B image are determined in the same manner as described above. The values acquired from color sensors 101G, 101B are corrected, and light source control is performed by use of the corrected values.

L0, L1, L2 . . . included in correction coefficient table 707 satisfy L0<L1<L2< . . . in terms of a luminance. As described above, when a bright part is large in a formed image, the acquired color sensor value is likely to be high, whereas when a dark part is large, the acquired color sensor values is likely to be low. In order to cancel the influence of this, RL2', for example, which is a correction coefficient corresponding to an image for which the APL indicates that a bright part is large, is set to such a value that obtains a correction amount larger than the correction amount to be obtained by RL0', for example, which is a correction coefficient corresponding to an image for which the APL indicates that a dark part is larger.

As exemplified by the above exemplary embodiments, the present invention corrects values acquired from the sensors on the basis of the result of analysis of image luminances, whereby this can correct, with high precision, sensor values of the images varied by the influence of reflection light. Accordingly, the precision of white balance adjustment using the sensors can be improved.

The color sensors are preferably disposed at such positions that cause no effect on sensor values due to operation of the image forming elements such as DMDs or liquid crystal panels. However, in an optical system using laser light sources, the system is shielded such that laser light does not leak to the outside. For this reason, the positions of the sensors cannot be changed easily if there is any effect on the sensor values.

However, with use of this method, appropriate white balance control can be performed without involving change of the positions of sensors.

In addition, the present invention is significantly effective in light control in which a quantity of light with which a display element is irradiated is adjusted according to the average luminance level or the histogram of an image to be displayed. In the light control, electric power to be supplied to the sources of light of respective colors are varied in order to adjust the output luminances of the sources of light of the respective colors and to adjust the quantities of light with which display elements of the respective colors are irradiated. The relationship between supplied electric power and output luminance may vary depending on the light source. In this case, the color balance becomes worse. In order to address this case, the intensities of the light sources have been detected by sensors, and have been corrected. However, in the present invention, values detected by the sensors are corrected on the basis of the analysis result of the luminances of the images. Accordingly, the present invention can improve the precision in light control.

REFERENCE SIGNS LIST

1-3 light source
20 illuminator
30 photosynthesizer
101R, 101G, 101B color sensor
301 histogram generator
302 controller
303 memory
304 DMD controller
306 light source controller
307 correction coefficient table

The invention claimed is:

1. A projector device, comprising:
   a plurality of light sources each of which emits a different type of color light;
   a plurality of image forming elements each of which, upon irradiation with the different type of color light, forms an image based on a respective video signal corresponding to the different type of color light;
   a plurality of sensors that are arranged in response to each of the plurality of light sources, each sensor being configured to detect a part of light emitted from a corresponding light source from among the plurality of light sources and being further configured such that a part of light from an image forming element of the image forming elements, to which the light from the corresponding light source is irradiated, enters said each sensor as stray light; and
   a controller that acquires luminance of the image formed by each of the plurality of image forming elements based on the respective video signal, makes a correction in which a component of the stray light is removed from respective detection values detected by the plurality of sensors based on an acquired respective image luminance, and adjusts a white balance by controlling outputs from the plurality of light sources based on the detection values of the plurality of sensors after the correction.

2. The projector device according to claim 1, wherein the image forming elements form the images in accordance with an image signal, the projector device further comprising:
- a histogram generator that generates histogram data obtained by generating a histogram of the image formed by the image forming element in accordance with the image signal; and
- a correction coefficient table in which a plurality of classes and a plurality of correction coefficients corresponding to the classes are stored, and
- wherein the controller determines a class of the classes from the histogram data, and corrects each of values detected by the sensors by use of a correction coefficient of the correction coefficients stored in the correction coefficient table so as to correspond to the determined class.

3. The projector device according to claim 2, wherein the correction coefficient table stores the correction coefficients such that a correction amount to be obtained by the correction coefficient corresponding to a class of the classes indicative of a bright image is larger than a correction amount to be obtained by the correction coefficient to be stored corresponding to a class of the classes indicative of a dark image.

4. The projector device according to claim 1, wherein the image forming elements form the images in accordance with an image signal, the projector device further comprising:
- an average luminance level (APL) calculator that obtains an average luminance level of the image formed by the image forming element in accordance with the image signal; and
- a correction coefficient table in which a plurality of average luminance level ranges and a plurality of correction coefficients corresponding to the ranges are stored, and
- wherein the controller determines the average luminance level range including the average luminance level obtained by the APL calculator, and corrects the values detected by the sensors by use of the correction coefficients stored in the correction coefficient table so as to correspond to the determined average level ranges.

5. The projector device according to claim 4, wherein the correction coefficient table stores the correction coefficients such that a correction amount to be obtained by the correction coefficient corresponding to the average luminance level range indicative of a bright image is larger than a correction amount to be obtained by the correction coefficient to be stored corresponding to the average luminance level range indicative of a dark image.

6. A color correcting method to be performed by a projector device including a plurality of light sources each of which emits a different type of color light and a plurality of image forming elements each of which, upon irradiation with the different type of color light, forms an image based on a respective video signal corresponding to the different type of color light, the method comprising:
- causing each of the plurality of sensors, which are arranged in response to each of the plurality of light sources, to detect a part of light emitted from a corresponding light source from among the plurality of light sources such that a part of light from an image forming element of the image forming elements, to which the light from the corresponding light source is irradiated, enters said each sensor as stray light; and
- acquiring luminance of the image formed by each of the plurality of image forming elements based on the respective video signal, making a correction in which a component of the stray light is removed from respective detection values detected b the plurality of sensors based on an acquired respective image luminance, and adjusting a white balance by controlling outputs from the plurality of light sources based on the detection values of the plurality of sensors after the correction.

7. The color correcting method to be performed by the projector device according to claim 6, wherein the image forming elements form the images in accordance with an image signal,
- wherein a histogram generator generates histogram data obtained by generating a histogram of the image formed by the image forming element in accordance with the image signal,
- wherein a correction coefficient table stores a plurality of classes and a plurality of correction coefficients corresponding to the classes, and
- wherein the controller determines a class of the classes from the histogram data, and corrects each of values detected by the sensors by use of a correction coefficient of the correction coefficients stored in the correction coefficient table so as to correspond to the determined class.

8. The color correcting method to be performed by the projector device according to claim 7, wherein the correction coefficient table stores the correction coefficients such that a correction amount to be obtained by the correction coefficient corresponding to a class of the classes indicative of a bright image is larger than a correction amount to be obtained by the correction coefficient corresponding to a class of the classes indicative of a dark image.

9. The color correcting method to be performed by the projector device according to claim 6, wherein the image forming elements form the images in accordance with an image signal,
- wherein an average luminance level (APL) calculator obtains an average luminance level of the image formed by the image forming element in accordance with the image signal,
- wherein, in the correction coefficient table, a plurality of the average luminance level ranges and a plurality of correction coefficients corresponding to the average luminance level ranges are stored, and
- wherein the controller determines an average luminance level range including the average luminance level obtained by the APL calculator, and corrects each of values detected by the sensors by use of the correction coefficient stored in the correction coefficient table so as to correspond to the determined average luminance level range.

10. The color correcting method to be performed by the projector device according to claim 9, wherein the correction coefficient table stores the correction coefficients such that a correction amount to be obtained by the correction coefficient corresponding to the average luminance level range indicative of a bright image is larger than a correction amount to be obtained by the correction coefficient to be stored corresponding to the average luminance level range indicative of a dark image.

11. The projector device according to claim 1, wherein, when first images formed by the image forming elements are brighter than second images formed by the image forming elements, the controller sets a correction amount for correcting the detection values that were detected when the second images were formed to be larger than a correction amount for correcting the detection values that were detected when the first images were formed.

12. The projector device according to claim 1, wherein the images formed by the image forming elements that are brighter have a larger correction amount for correcting the detection values.

13. The projector device according to claim 1, further comprising:
a correction coefficient table in which a plurality of classes and a plurality of correction coefficients corresponding to the classes are stored,
wherein the correction coefficient table stores the correction coefficients such that a correction amount to be obtained by a correction coefficient corresponding to a class of the classes indicative of a bright image is larger than a correction amount to be obtained by a correction coefficient to be stored corresponding to a class of the classes indicative of a dark image.

14. The projector device according to claim 13, wherein a histogram analysis is performed on the image such that a correction coefficient of the correction coefficients to be used for the image is determined.

15. The projector device according to claim 1, further comprising:
a correction coefficient table in which a plurality of average luminance level ranges and a plurality of correction coefficients corresponding to the ranges are stored,
wherein the correction coefficient table stores the correction coefficients such that a correction amount to be obtained by a correction coefficient corresponding to the average luminance level range indicative of a bright image is larger than a correction amount to be obtained by a correction coefficient to be stored corresponding to the average luminance level range indicative of a dark image.

16. The projector device according to claim 15, wherein the correction coefficients are determined by an average luminance level (APL) of the image.

17. The color correcting method to be performed by the projector device according to claim 6, wherein, when first images formed by the image forming elements are brighter than second images formed by the image forming elements, the controller sets a correction amount for correcting the detection values that were detected when the second images were formed to be larger than a correction amount for correcting the detection values that were detected when the first images were formed.

18. The color correcting method to be performed by the projector device according to claim 6, wherein the images formed by the image forming elements that are brighter have a larger correction amount for correcting the detection values.

19. The color correcting method to be performed by the projector device according to claim 6, wherein a correction coefficient table stores a plurality of classes and a plurality of correction coefficients corresponding to the classes, and
wherein the correction coefficient table stores the correction coefficients such that a correction amount to be obtained by a correction coefficient corresponding to a class of the classes indicative of a bright image is larger than a correction amount to be obtained by a correction coefficient to be stored corresponding to a class of the classes indicative of a dark image.

20. The color correcting method to be performed by the projector device according to claim 19, wherein a histogram analysis is performed on the image such that a correction coefficient of the correction coefficients to be used for the respective image is determined.

* * * * *